US011383424B2

(12) United States Patent
Castillo et al.

(10) Patent No.: US 11,383,424 B2
(45) Date of Patent: Jul. 12, 2022

(54) SYSTEM AND METHOD FOR THERMOFORMING AN OBJECT

(71) Applicant: GENERAL ELECTRIC COMPANY, Schenectady, NY (US)

(72) Inventors: Edward John Castillo, Waukesha, WI (US); Jesse Edward Schrimpf, Waukesha, WI (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 790 days.

(21) Appl. No.: 15/962,103

(22) Filed: Apr. 25, 2018

(65) Prior Publication Data

US 2019/0329481 A1 Oct. 31, 2019

(51) Int. Cl.
| B29C 51/36 | (2006.01) |
| B29C 51/10 | (2006.01) |
| B29C 51/18 | (2006.01) |
| B29K 105/00 | (2006.01) |

(52) U.S. Cl.
CPC ............ *B29C 51/365* (2013.01); *B29C 51/10* (2013.01); *B29C 51/18* (2013.01); *B29K 2105/256* (2013.01); *B29K 2855/02* (2013.01); *B29K 2869/00* (2013.01); *B29K 2879/085* (2013.01); *B29K 2905/00* (2013.01)

(58) Field of Classification Search
CPC ....... B29C 51/365; B29C 51/10; B29C 51/18; B29C 51/02; B29C 51/06; B29C 51/36; B29C 2043/3205; B29C 2043/3233; B29C 44/42; B29C 57/08; B29C 63/20
See application file for complete search history.

(56) References Cited

U.S. PATENT DOCUMENTS

| 4,475,881 A | 10/1984 | Borst et al. |
| 5,795,535 A | 8/1998 | Giovannone et al. |
| 7,255,552 B2 | 8/2007 | Michelon et al. |
| 2007/0151658 A1* | 7/2007 | Khambete ............ B60R 13/083 156/222 |
| 2008/0258329 A1* | 10/2008 | Polk ....................... B29C 51/02 264/101 |

FOREIGN PATENT DOCUMENTS

| DE | 102004026417 | * 12/2005 |
| DE | 102004026417 A1 | 12/2005 |
| EP | 2305449 B1 | 1/2013 |

OTHER PUBLICATIONS

DE 102004026417 A1—English translation of Abstract; obtained from Espacenet.com Feb. 14, 2020.
European patent application 19170435.2 filed Apr. 19, 2019; European Search Report dated Oct. 1, 2019; 8 pages.

* cited by examiner

*Primary Examiner* — Stella K Yi
(74) *Attorney, Agent, or Firm* — Grogan, Tuccillo & Vanderleeden, LLP

(57) ABSTRACT

A system for thermoforming an object is provided. The system includes a mold and a pressure-box. The mold has a surface that defines a shape of the object and includes two or more portions of differing porosities. The pressure-box is operative to generate a pressure differential across the surface. The two or more portions apply the pressure differential at different loads, based at least in part on the differing porosities, to a material disposed onto the surface so as to form the object by deforming the material into the shape.

19 Claims, 5 Drawing Sheets

SYSTEM AND METHOD FOR THERMOFORMING AN OBJECT

BACKGROUND

Technical Field

Embodiments of the invention relate generally to additive manufacturing, and more specifically, to a system and method for thermoforming an object.

Discussion of Art

Thermoforming is a manufacturing process in which a plastic sheet, also referred to as a "film", is heated to a pliable forming temperature, formed to a specific shape in a mold, and subsequently trimmed to create a useable product. Many thermoforming processes use molds having at least one surface with a plurality of holes that allow a vacuum to pull, i.e., "suck", the film against the surface so as to stretch and/or otherwise deform the film to make it conform to the shape of the surface.

The holes of such molds are typically drilled through the surface after the body of the mold has been formed. As will be understood, however, due to technological and/or structural limitations, it is often impractical and/or impossible to drill holes at certain locations along a surface, e.g., in a tight corner, curve, and/or otherwise heavily contoured regions. As a result, many traditional molds have "dead zones", i.e., areas of no suction. Molds with such dead zones may be unable to provide adequate and/or uniform suction of the film along the entirety of the surface. Further, the drilling of such holes is often performed as a separate manufacturing step/process apart from the formation of the mold, which is usually labor and/or cost intensive.

Additionally, the diameters of the holes are often uniform in size, which usually results in uniform force/pull on the film at distal ends of the surface, i.e., high and low points. As will be appreciated, however, such uniform force may cause the film to stretch too much too quickly. For example, a first portion of a film may strongly adhere to a high point of the surface while a second portion of the film is still traveling towards a lower portion of the surface. As the second portion of the film begins to strongly adhere to the lower portion of the surface, portions of the film between the first and second portions may be overstretched. Overstretching may result in structural defects in the final product formed from the film.

What is needed, therefore, is an improved system and method for thermoforming an object.

BRIEF DESCRIPTION

In an embodiment, a system for thermoforming an object is provided. The system includes a mold and a pressure-box. The mold has a surface that defines a shape of the object and includes two or more portions of differing porosities. The pressure-box is operative to generate a pressure differential across the surface. The two or more portions apply the pressure differential at different loads, based at least in part on the differing porosities, to a material disposed onto the surface so as to form the object by deforming the material into the shape.

In another embodiment, a method of thermoforming an object is provided. The method includes disposing a material onto a surface of a mold, the surface defining a shape of the object and including two or more portions of differing porosities. The method further includes generating a pressure differential across the surface via a pressure-box; and forming the object by applying the pressure differential to the material via the two or more portions at different loads, based at least in part on the differing porosities, so as to deform the material into the shape.

In yet another embodiment, a mold for thermoforming an object is provided. The mold includes a surface and a mounting portion. The surface defines a shape of the object and includes two or more portions of differing porosities. The mounting portion is operative to fluidly connect the surface to a pressure-box that generates a pressure differential. The two or more portions are operative apply the pressure differential at different loads, based at least in part on the differing porosities, to a material disposed onto the surface so as to form the object by deforming the material into the shape.

DRAWINGS

The present invention will be better understood from reading the following description of non-limiting embodiments, with reference to the attached drawings, wherein below:

DETAILED DESCRIPTION

Figure 1:
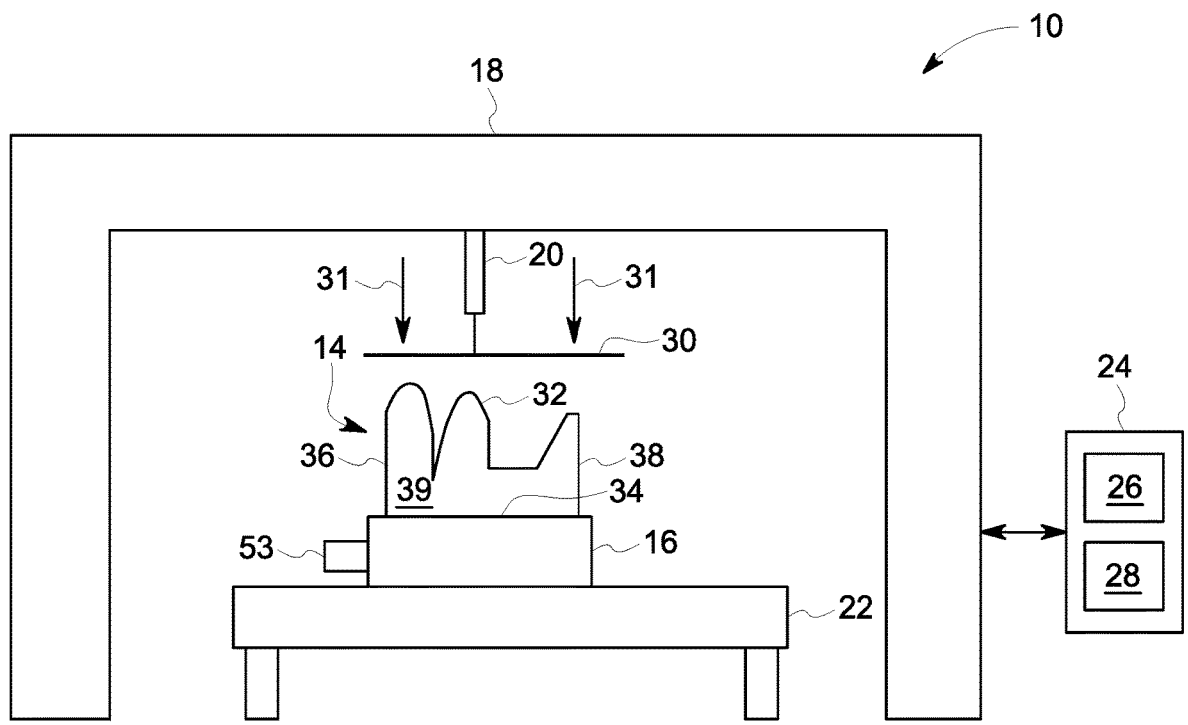
FIG. 1 is a diagram of a system for thermoforming an object, in accordance with an embodiment of the present invention.

Reference will be made below in detail to exemplary embodiments of the invention, examples of which are illustrated in the accompanying drawings. Wherever possible, the same reference characters used throughout the drawings refer to the same or like parts, without duplicative description.

As used herein, the terms "substantially," "generally," and "about" indicate conditions within reasonably achievable manufacturing and assembly tolerances, relative to ideal desired conditions suitable for achieving the functional purpose of a component or assembly. As used herein, "electrically coupled," "electrically connected," and "electrical communication" mean that the referenced elements are directly or indirectly connected such that an electrical current may flow from one to the other. The connection may include a direct conductive connection, i.e., without an intervening capacitive, inductive or active element, an inductive connection, a capacitive connection, and/or any other suitable electrical connection. Intervening components may be present. The term "real-time," as used herein, means a level of processing responsiveness that a user senses as sufficiently immediate or that enables the processor to keep up with an external process. As used herein, the terms "porosity", "porosities", and "porousness" refer to an amount/degree to which a substance, e.g., a liquid, gas, and/or plasma, may pass through an object. As used herein, the term "load" refers to a mechanical force on an object, e.g., pulling and or pushing.

Additionally, while the embodiments disclosed herein are described with respect to a thermoforming mold, it is to be understood that embodiments of the present invention are equally applicable to other processes and/or devices in which an object requires portions having varying porosities.

Figure 2:
FIG. 2 is a diagram of the object thermoformed via the system of FIG. 1, in accordance with an embodiment of the present invention.

Referring now to FIG. 1, the major components of a system 10 for thermoforming an object 12 (FIG. 2), according to an embodiment of the invention, are shown. The system 10 includes a mold 14 and a pressure box 16. In certain embodiments, the system 10 may further include a gantry 18 with mobile arm 20, a structural support 22 for the mold 14, and/or a controller 24 having at least one processor 26 and a memory device 28. As will be explained in greater detail below, a portion of material 30, which may be in the form of a sheet, is disposed onto the mold 14, in the direction of arrows 31, so as to from the object 12.

Figure 6:
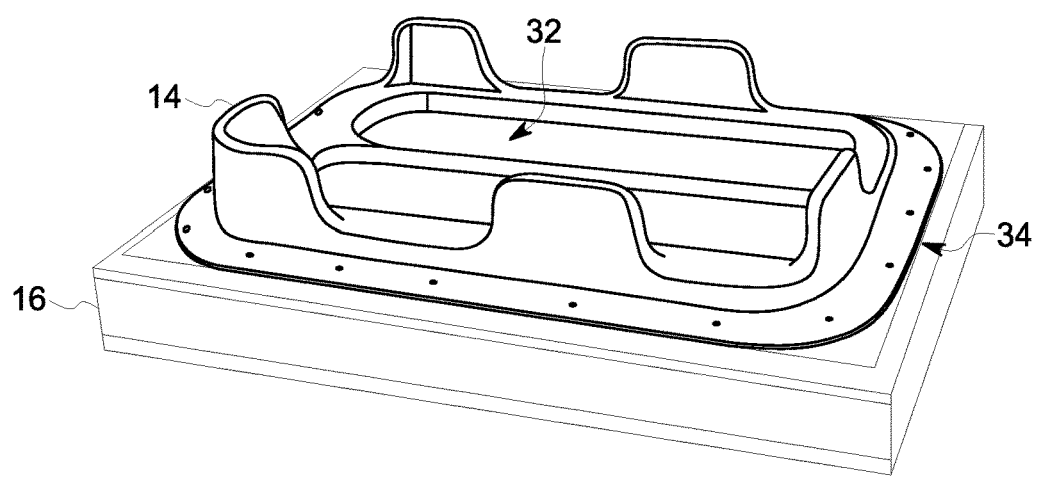
FIG. 6 is a perspective view of another embodiment of the mold of FIG. 3, in accordance with an embodiment of the present invention.
Figure 7:
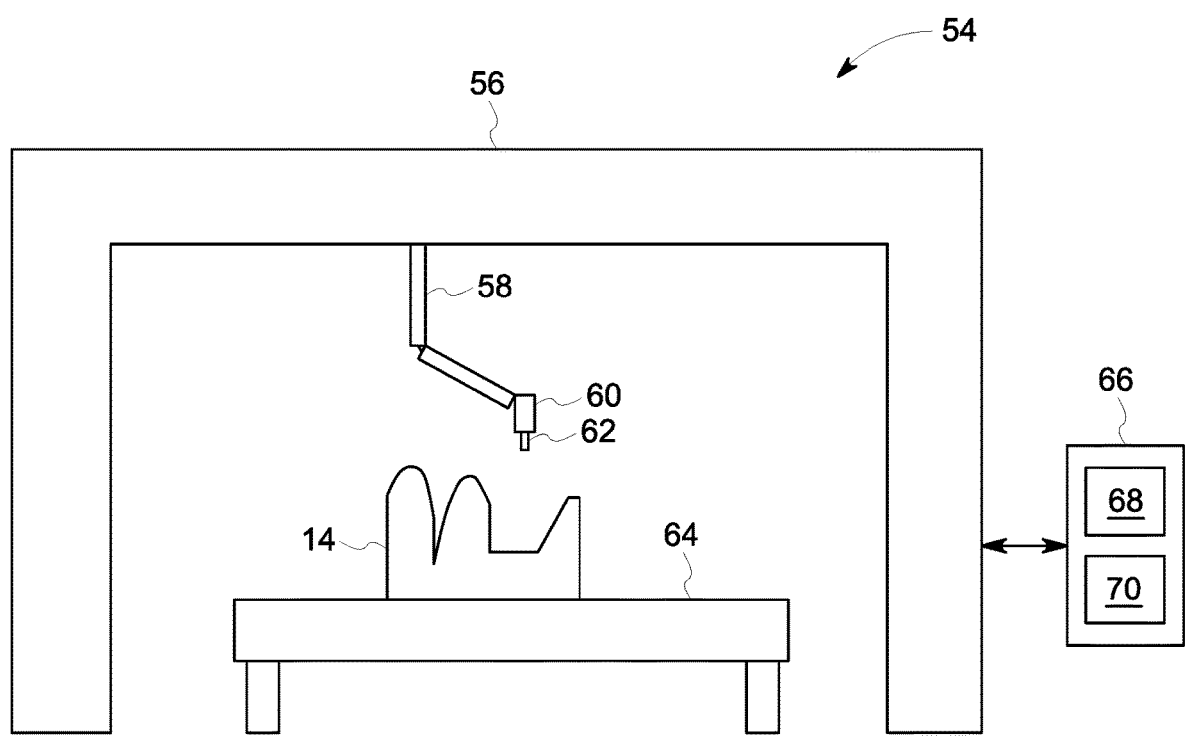
FIG. 7 is a diagram of a system for manufacturing the mold of FIG. 3, in accordance with an embodiment of the present invention.

As shown in FIG. 1, in embodiments, the mold 14 has a first/top surface 32 and may have a second/bottom surface 34 disposed opposite the first surface 32. The mold 14 may also have additional/side surfaces 36 and 38. One or more of the surfaces 32, 34, 36, and/or 38 may define an interior volume and/or cavity 39. The mold 14 may be made from a metal, e.g., steel, copper, tin, zinc, aluminum, etc., and/or a polymer, e.g., acrylonitrile butadiene styrene, polycarbonate, polytehylenimine, etc., and/or other materials suitable for deforming the material 30. As will be understood, while the mold 14 is depicted in FIGS. 1, 3, and 7 in two-dimensional form, it is to be understood that embodiments of the mold 14 are three dimensional, as shown in FIGS. 4, 5, 6, 8, 9, and 10.

Figure 3:
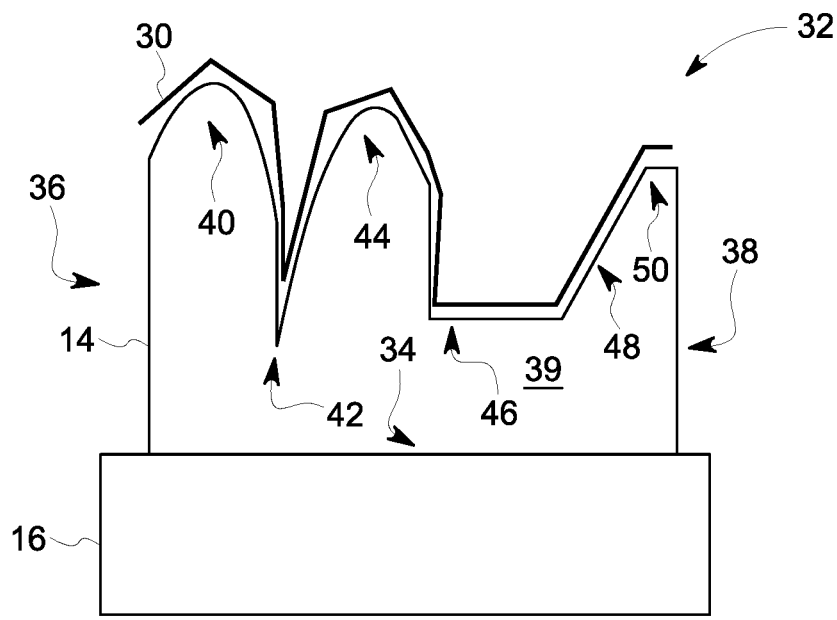
FIG. 3 is a diagram of a mold and pressure box of the system of FIG. 1, in accordance with an embodiment of the present invention.
Figure 4:
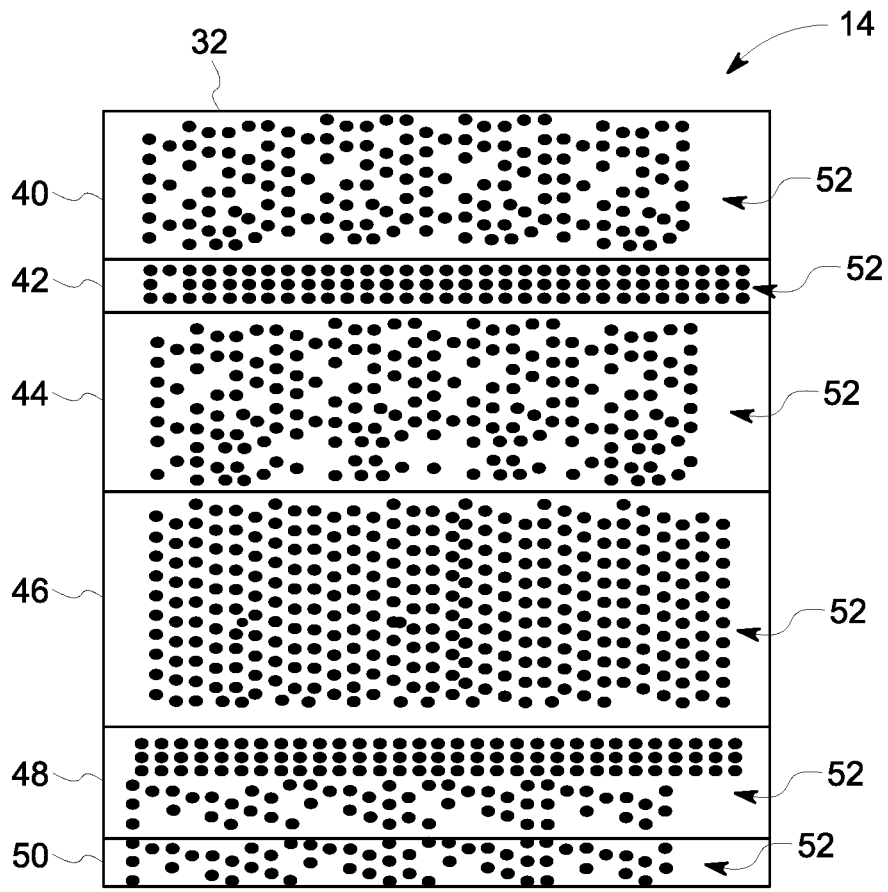
FIG. 4 is a diagram of a surface of the mold of FIG. 3, in accordance with an embodiment of the present invention.
Figure 5:
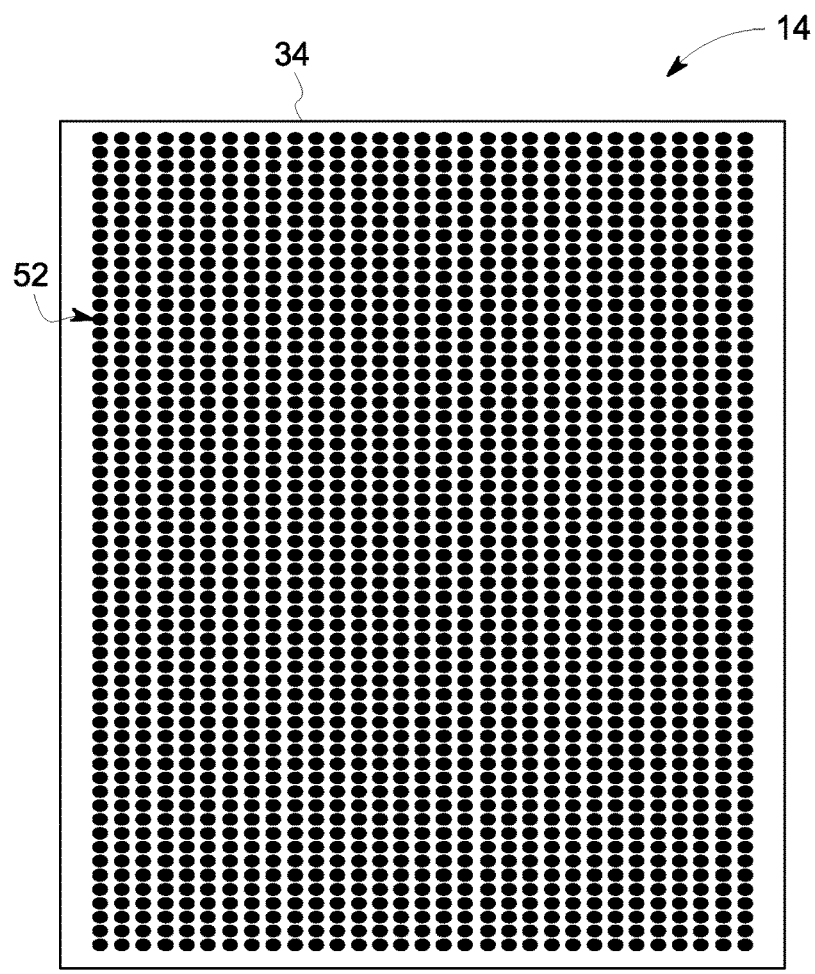
FIG. 5 is a diagram of another surface of the mold of FIG. 3, in accordance with an embodiment of the present invention.

As illustrated in FIGS. 3, 4, and 5, in embodiments, the first surface 32 defines a shape of the object 12 and may include two or more portions/regions/areas 40, 42, 44, 46, 48, 50 (best seen in FIGS. 3 and 4) that have differing porosities. For example, the regions 40, 42, 44, 46, 48, 50 may have pores 52 (generally represented by the black circles in FIGS. 4 and 5) with degrees of porosity based at least in part on the number, size, and/or shape of the pores 52 within the portions 40, 42, 44, 45, 48, 50. As will be appreciated, in embodiments, the porosity of each portion 40, 42, 44, 45, 48, 50 may be from about 10% material reduction to about 80% material reduction, with the pores 52 having diameters of between about 0.05 mm to about 1.0 mm. In embodiments, the pores 52 may be spaced apart, e.g., the distance between circumferences, by about 0.178 mm to about 0.33 mm.

As can be further seen in FIGS. 3 and 4, in embodiments, portions 40, 44, 50 that are high may have a lower porosity than portions 42, 46 that are low. As will be understood, high portions 40, 44, 50 are portions that are contacted earlier/sooner by the material 30 than low portions 42, 46. It will be understood, however, that, in embodiments, the porosity may be varied among the portions 40, 42, 44, 46, 48, 50 in other manners/schemes. For example, in embodiments, the porosity of the low portions 42, 46 may be lower than the porosity of the high portions 40, 44, 50. Further, the porosity across a portion 48 may vary as best seen in FIG. 4.

In embodiments, the second surface 34 may also include pores 52 and/or other types of openings, e.g., slits, sufficient to allow a medium, e.g., air, liquid, plasma, to pass through. While the second surface 34 is depicted herein as having a relatively flat shape, it will be understood that the shape of the surface 34 may be non-flat, e.g., curved, angled, etc. The porosity of the second surface 34 may be between about 10% material reduction to about 95% material reduction. Further, embodiments of the mold 14 may not include a bottom/second surface 34 such that the interior volume 39 (FIGS. 1 and 3) is fully, or substantially, open.

Referring back to FIG. 1, the pressure box 16 is operative to generate a pressure differential across the surface 32. The pressure differential may be effected via a medium, e.g., gas, liquid, plasma, and be positive pressure with respect to the material 30, i.e., pushing against the material 30 in a direction away from the surface 32, or a vacuum/negative pressure with respect to the material 30, i.e., pulling the material 30 towards the surface 32. Accordingly, the pressure box 16 may include one or more pumps 53, e.g., air pumps, water pumps, and/or other types of devises suitable for generating the pressure differential. In embodiments, the pressure box 16 may provide an air and/or liquid tight, or substantially air tight and/or liquid tight, seal with the cavity/volume 39. For example, the pressure box 16 may be configured/shaped so that it fits against and/or receives the second surface 34. In such embodiments, the second surface 34 may be and/or serve as a mounting portion of the mold 14 that fluidly connects the surface 32 to the pressure box 16 as best seen in FIG. 6.

In operation, according to an embodiment of the system 10, the material 30 may be lowered/disposed onto the surface 32 of the mold 14 via the gantry 18 and mobile arm 20, with the pressure box 16 generating a vacuum across the surface 32, and with the high portions 40, 44, and 50 having a lower porosity than the low portions 42, 46. As will be appreciated, the higher or lower the porosity of a portion, the larger or smaller the corresponding load generated on the material 30 via the pressure differential. Accordingly, the material 30 is subsequently pulled towards the low portions 42, 46 without, or with minimal, overstretching and/or other defects. In other words, the portions 40, 42, 44, 46, and 50 apply the pressure differential to the material 30 at different loads based on the difference in porosity, e.g., the low portions 42, 46 with high porosity generate a higher load on the material 30 than the high portions 40, 44, 50 with low porosity. Thus, the parts of the material 30 that will ultimately conform to the shape of the low portions 42, 46 are allowed to move towards the low portions more easily than if the porosity across all portions 40, 42, 44, 46, 50 were uniform, with the material 30 continuing to move towards/against the surface 32 so as to form the object 12 by deforming into the shape of the first surface 32.

As will be understood, the material 30 may be considered to be the same as the object 12 upon achieving the desired shape whereupon it may be removed from the mold 14. In embodiments, removal of the object 12 from the mold 14 may be performed and/or assisted by generating a positive pressure differential via the pressure box 16 such that the object 12 is pushed away from the surface 32.

Turning to FIG. 7, a system 54 for additively manufacturing the mold 14 is shown. The system 54 may include a gantry 56 with a mobile arm 58 having a print-head 60 with nozzle 62, and a support table/substrate 64. In embodiments, the system 54 may further include a controller 66 having at least one processor 68 and a memory device 70. The print head 60 may be moved over the substrate 64 via the gantry 56 and/or mobile arm 58 such that the nozzle 62 dispenses filaments/strips/dots of a material that will form the mold 14.

Figure 8:
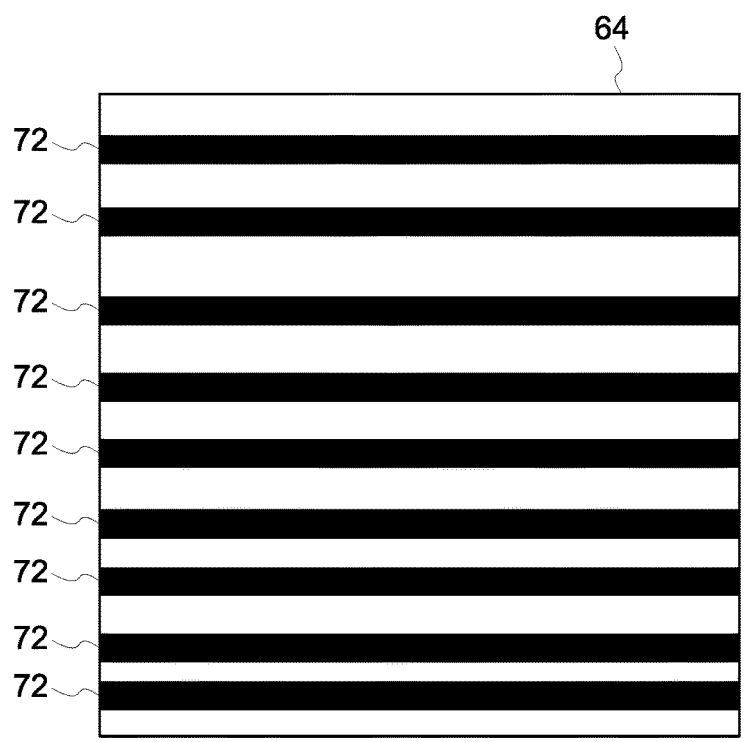
FIG. 8 is a diagram of a first layer of material strips printed via the system of FIG. 7, in accordance with an embodiment of the present invention.
Figure 9:
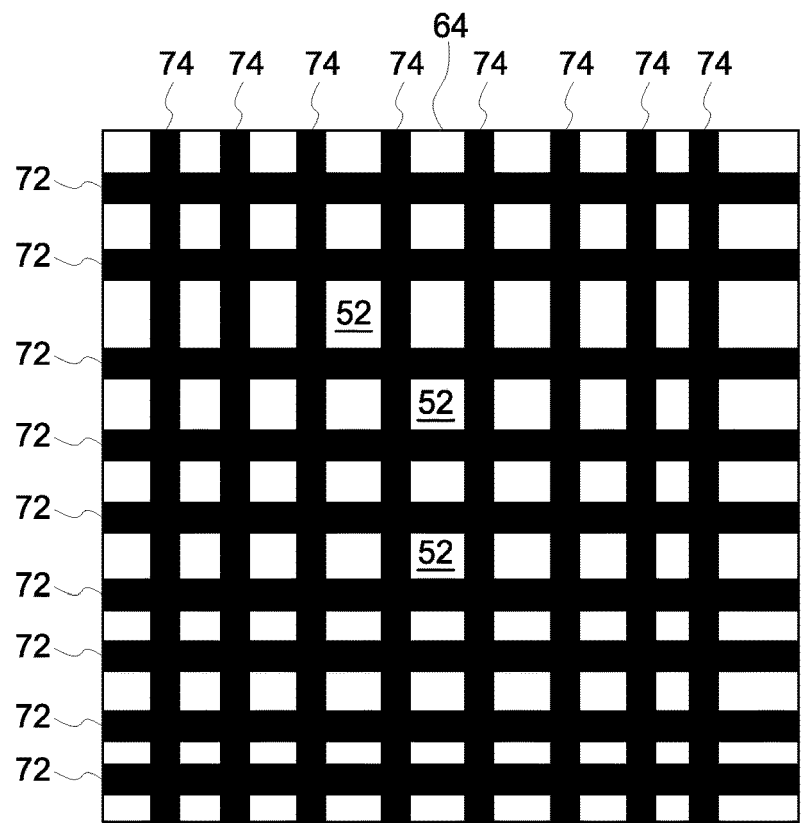
FIG. 9 is a diagram of a second layer of material strips printed over the first layer of material strips of FIG. 8 via the system of FIG. 7, in accordance with an embodiment of the present invention.

For example, turning to FIG. 8, the system 54 may print a first layer of strips 72 which may have a width of about 0.178 mm to about 0.33 mm spaced apart by about 0.5 mm to about 5.0 mm. As shown in FIG. 9, a second layer of strips 74 may be printed over the first layer of strips 72 at an offset so as to form the pores 52. Strips 74 may have widths and/or spacings within the same ranges as strips 72. As will be appreciated, additional layers may be printed on top of strips 74 in a manner similar to the printing of strips 72 and/or 74. In embodiments, the width and/or spacing of the strips 72, 74, as well as the number of layers, i.e., the thickness of the mold 14, may be varied at different portions, e.g., 40, 42, 44, 46, 48, 50 (FIG. 3), which in turn, varies the corresponding porosities. Further, strips 72 and 74 may be printed in such a manner that pores 52 are disposed/located on heavily contoured regions of the surface 32, which in turn, eliminates and/or reduces "dead zones". Further still, in some embodiments, the width and/or spacing between the strips 72 and 74 may be varied to as to create pores 52 having different diameters and/or shapes. The mold 14 may be made by other additive manufacturing methods/systems other than system 54.

Figure 10:
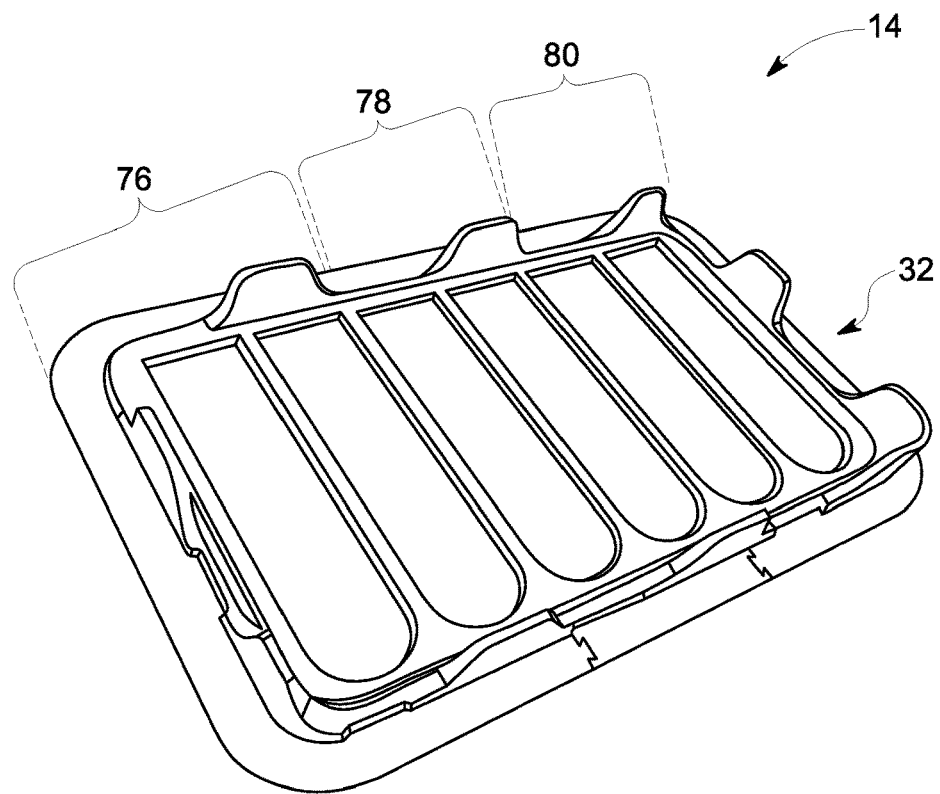
FIG. 10 is a perspective diagram of another embodiment of the mold of FIG. 3, wherein the mold includes two or more sections, in accordance with an embodiment of the present invention.

Referring now to FIG. 10, in embodiments, the mold 14 may be formed from two or more independently fabricated sections 76, 78, and 80. As used herein, the term "independently fabricated" means to be formed/manufactured apart from other objects. For example, each of sections 76, 78, and 80 may exist independently of one another despite being combinable/joinable into a greater object, i.e., the mold 14.

Finally, it is also to be understood that the systems 10 and/or 54 may include the necessary electronics, software, memory, storage, databases, firmware, logic/state machines, microprocessors, communication links, displays or other visual or audio user interfaces, printing devices, and any other input/output interfaces to perform the functions described herein and/or to achieve the results described herein, which may be accomplished in real-time. For example, as previously mentioned, systems 10 and/or 54 may include at least one processor and system memory/data storage structures, which may include random access memory (RAM) and read-only memory (ROM). The at least one processor of the systems may include one or more conventional microprocessors and one or more supplementary co-processors such as math co-processors or the like. The data storage structures discussed herein may include an appropriate combination of magnetic, optical and/or semiconductor memory, and may include, for example, RAM, ROM, flash drive, an optical disc such as a compact disc and/or a hard disk or drive.

Additionally, a software application that adapts the controllers to perform the methods disclosed herein may be read into a main memory of the at least one processor from a computer-readable medium. The term "computer-readable medium," as used herein, refers to any medium that provides or participates in providing instructions to the at least one processor of the systems 10 and/or 54 (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, a RAM, a PROM, an EPROM or EEPROM (electronically erasable programmable read-only memory), a FLASH-EEPROM, any other memory chip or cartridge, or any other medium from which a computer can read.

While in embodiments, the execution of sequences of instructions in the software application causes at least one processor to perform the methods/processes described herein, hard-wired circuitry may be used in place of, or in combination with, software instructions for implementation of the methods/processes of the present invention. Therefore, embodiments of the present invention are not limited to any specific combination of hardware and/or software.

It is further to be understood that the above description is intended to be illustrative, and not restrictive. For example, the above-described embodiments (and/or aspects thereof) may be used in combination with each other. Additionally, many modifications may be made to adapt a particular situation or material to the teachings of the invention without departing from its scope.

For example, in an embodiment, a system for thermoforming an object is provided. The system includes a mold and a pressure-box. The mold has a surface that defines a shape of the object and includes two or more portions of differing porosities. The pressure-box is operative to generate a pressure differential across the surface. The two or more portions apply the pressure differential at different loads, based at least in part on the differing porosities, to a material disposed onto the surface so as to form the object by deforming the material into the shape. In certain embodiments, the two or more portions have pores with diameters of between about 0.05 mm to about 1 mm. In certain embodiments, the two or more portions have pores that are spaced apart by about 0.178 mm to about 0.33 mm. In certain embodiments, the mold includes at least one of a metal and a polymer. In certain embodiments, the polymer is at least one of acrylonitrile butadiene styrene, polycarbonate, and polyethyleneimine. In certain embodiments, the pressure differential across the surface is negative with respect to the material. In certain embodiments, the pressure differential across the surface is positive with respect to the material. In certain embodiments, the mold includes two or more independently fabricated sections.

Other embodiments provide for a method of thermoforming an object. The method includes disposing a material onto a surface of a mold, the surface defining a shape of the object and including two or more portions of differing porosities. The method further includes generating a pressure differential across the surface via a pressure-box; and forming the object by applying the pressure differential to the material via the two or more portions at different loads, based at least in part on the differing porosities, so as to deform the material into the shape. In certain embodiments, the two or more portions have pores with diameters of between about 0.05 mm to about 1 mm. In certain embodiments, the two or more portions have pores that are spaced apart by about 0.178 mm to about 0.33 mm. In certain embodiments, the mold comprises at least one of a metal and a polymer. In certain embodiments, the polymer is at least one of acrylonitrile butadiene styrene, polycarbonate, and polytehylenimine. In certain embodiments, generating a pressure differential across the surface via a pressure-box comprises generating a vacuum across the surface with respect to the material. In certain embodiments, generating a pressure differential across the surface via a pressure-box comprises generating a positive pressure across the surface with respect to the material. In certain embodiments, the mold comprises of two or more independently fabricated sections.

Yet still other embodiments provide for a mold for thermoforming an object. The mold includes a surface and a mounting portion. The surface defines a shape of the object and includes two or more portions of differing porosities. The mounting portion is operative to fluidly connect the surface to a pressure-box that generates a pressure differential. The two or more portions are operative apply the pressure differential at different loads, based at least in part on the differing porosities, to a material disposed onto the surface so as to form the object by deforming the material into the shape. In certain embodiments, the two or more portions have pores with diameters of between about 0.05 mm to about 1 mm. In certain embodiments, the two or more portions have pores that are spaced apart by about 0.178 mm to about 0.33 mm. In certain embodiments, the mold comprises of two or more independently fabricated sections.

Accordingly, as will be appreciated, by providing for a mold having portions of differing porosity, some embodiments of the present invention provide for a thermoforming tool/mold that reduces the risk of overstretching and/or other defects by controlling the loads that deform a material sheet, as compared to traditional thermoforming tools which typically have uniform porosity.

Further, by additively manufacturing the pores into the mold, some embodiments of the present invention eliminate and/or reduce the risk of tooling marks, which are often formed when drilling pores into an object. As will be appreciated, eliminating and/or reducing tooling marks in a mold, in turn reduces and/or eliminates corresponding marks in an object made from the mold. Thus, some embodiments of the present invention provide for "cleaner" thermoforming molds that generate less blemishes and/or structural deformities in a finished object, as compared to traditional molds.

Further still, by additively manufacturing pores into a mold, some embodiments of the present invention may reduce the need for secondary operation air flow channels, which in turn may reduce the cost to manufacture such thermoforming molds, as compared to traditional methods, which often entail drilling pores into molds.

Yet further still, by additively manufacturing pores into a mold, some embodiments of the present invention provide for the ability to locate pores in regions of a mold, e.g., high curvature areas, previously unattainable via traditional tooling methods. Thus, some embodiments of the present invention may provide for better control/application of the forces/loads that pull and/or push a material sheet towards and from the surface of the mold, and/or provide for a better fitting of the material sheet to the mold, as compared to traditional molds with limited pore locations.

Additionally, while the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format are not intended to be interpreted as such, unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

What is claimed is:

1. A system for thermoforming an object comprising:
    a mold having a surface that defines a shape of the object and includes two or more portions of differing pore sizes and porosities;
    a pressure-box operative to generate a pressure differential across the surface;
    wherein the two or more portions apply the pressure differential at different loads, based at least in part on the differing porosities, to a material disposed onto the surface so as to form the object by deforming the material into the shape; and,
    wherein the mold comprises at least one of a metal and a polymer.

2. The system of claim 1, wherein the two or more portions have pores with diameters of between about 0.05 mm to about 1 mm.

3. The system of claim 1, wherein the two or more portions have pores that are spaced apart by about 0.178 mm to about 0.33 mm.

4. The system of claim 1, wherein the polymer is at least one of acrylonitrile butadiene styrene, polycarbonate, and polytehylenimine.

5. The system of claim 1, wherein the pressure differential across the surface is negative with respect to the material.

6. The system of claim 1, wherein the pressure differential across the surface is positive with respect to the material.

7. The system of claim 1, wherein the mold comprises of two or more independently fabricated sections.

8. A method of thermoforming an object comprising:
disposing a material onto a surface of a mold, the surface defining a shape of the object and including two or more portions of differing pore sizes and porosities;
generating a pressure differential across the surface via a pressure-box;
forming the object by applying the pressure differential to the material via the two or more portions at different loads, based at least in part on the differing porosities, so as to deform the material into the shape; and,
wherein the mold comprises at least one of a metal and a polymer.

9. The method of claim 8, wherein the two or more portions have pores with diameters of between about 0.05 mm to about 1 mm.

10. The method of claim 8, wherein the two or more portions have pores that are spaced apart by about 0.178 mm to about 0.33 mm.

11. The method of claim 8, wherein the polymer is at least one of acrylonitrile butadiene styrene, polycarbonate, and polytehylenimine.

12. The method of claim 8, wherein generating a pressure differential across the surface via a pressure-box comprises generating a vacuum across the surface with respect to the material.

13. The method of claim 8, wherein generating a pressure differential across the surface via a pressure-box comprises generating a positive pressure across the surface with respect to the material.

14. The method of claim 8, wherein the mold comprises of two or more independently fabricated sections.

15. A mold for thermoforming an object comprising:
a surface defining a shape of the object and including two or more portions of differing pore sizes and porosities;
a mounting portion operative to fluidly connect the surface to a pressure-box that generates a pressure differential;
wherein the two or more portions are operative to apply the pressure differential at different loads, based at least in part on the differing porosities, to a material disposed onto the surface so as to form the object by deforming the material into the shape; and,
wherein the surface defining the shape of the object comprises at least one of a metal and a polymer.

16. The mold of claim 15, wherein the two or more portions have pores with diameters of between about 0.05 mm to about 1 mm.

17. The mold of claim 15, wherein the two or more portions have pores that are spaced apart by about 0.178 mm to about 0.33 mm.

18. The mold of claim 15, wherein the mold comprises of two or more independently fabricated sections.

19. A system for thermoforming an object comprising:
a mold having a surface that defines a shape of the object and includes two or more portions of differing pore sizes and porosities;
a pressure-box operative to generate a pressure differential across the surface; and,
wherein the two or more portions apply the pressure differential at different loads, based at least in part on the differing porosities, to a material disposed onto the surface so as to form the object by deforming the material into the shape;
wherein the mold comprises at least one of a metal and a polymer; and,
wherein the polymer is at least one selected from the group of acrylonitrile butadiene styrene, polycarbonate, and polytehylenimine.

* * * * *